US012400642B2

(12) United States Patent
Kuhrt et al.

(10) Patent No.: US 12,400,642 B2
(45) Date of Patent: Aug. 26, 2025

(54) METHOD FOR PROCESSING AN AUDIO SIGNAL, METHOD FOR CONTROLLING AN APPARATUS AND ASSOCIATED SYSTEM

(71) Applicant: Siemens Healthineers AG, Forchheim (DE)

(72) Inventors: Soeren Kuhrt, Erlangen (DE); Iwona Markuszewska, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 267 days.

(21) Appl. No.: 17/944,311

(22) Filed: Sep. 14, 2022

(65) Prior Publication Data
US 2023/0079180 A1 Mar. 16, 2023

(30) Foreign Application Priority Data
Sep. 16, 2021 (EP) .................... 21197181

(51) Int. Cl.
*G10L 15/18* (2013.01)
*G06F 40/284* (2020.01)
(Continued)

(52) U.S. Cl.
CPC ........ *G10L 15/1815* (2013.01); *G06F 40/284* (2020.01); *G10L 15/04* (2013.01); *G10L 15/1822* (2013.01); *G10L 15/22* (2013.01); *G10L 25/45* (2013.01); *G10L 25/87* (2013.01); *G10L 2015/223* (2013.01); *G10L 2025/786* (2013.01)

(58) Field of Classification Search
CPC . G10L 15/1815; G10L 15/04; G10L 15/1822; G10L 15/22; G10L 25/45; G10L 25/87; G10L 2015/223; G10L 2025/786; G06F 40/284

USPC ............................................. 704/9
See application file for complete search history.

(56) References Cited

U.S. PATENT DOCUMENTS

2016/0232897 A1* 8/2016 Pereira .................. G06F 3/167
2019/0378493 A1* 12/2019 Kim ..................... G10L 15/25
(Continued)

FOREIGN PATENT DOCUMENTS

CN 110047470 A * 7/2019
DE 102006045719 B4 8/2008

OTHER PUBLICATIONS

Maas, Roland et al: "Combining Acoustic Embeddings and Decoding Features for End-of-Utterance Detection in Real-Time Far-Field Speech Recognition Systems"; 2018 IEEE International Conference on Acoustics, Speech and Signal Processing (ICASSP), IEEE; Apr. 15, 2018 (Apr. 15, 2018), pp. 5544-5548, XP033403996.
(Continued)

*Primary Examiner* — Edwin S Leland, III
(74) *Attorney, Agent, or Firm* — Harness, Dickey & Pierce, P.L.C.

(57) ABSTRACT

In a method for processing an audio signal, the audio signal is continuously analyzed substantially in real time from a recognized beginning of the speech input to provide a speech analysis result. The speech analysis result is used to dynamically define an end of the speech input. A speech data stream is provided based on the audio signal between the beginning and the end. The speech data stream may be further analyzed to identify one or more speech commands.

18 Claims, 7 Drawing Sheets

(51) Int. Cl.
*G10L 15/04* (2013.01)
*G10L 15/22* (2006.01)
*G10L 25/45* (2013.01)
*G10L 25/87* (2013.01)
*G10L 25/78* (2013.01)

(56) References Cited

U.S. PATENT DOCUMENTS

2021/0027780 A1* 1/2021 Garcia .................... G06F 3/167
2023/0079180 A1* 3/2023 Kuhrt ...................... G10L 25/87
704/9

OTHER PUBLICATIONS

Baiyang, Liu et al: "Accurate endpointing with expected pause duration"; Interspeech 2015; Sep. 6, 2015 (Sep. 6, 2015), pp. 2912-2916, XP055895594.

* cited by examiner

METHOD FOR PROCESSING AN AUDIO SIGNAL, METHOD FOR CONTROLLING AN APPARATUS AND ASSOCIATED SYSTEM

CROSS-REFERENCE TO RELATED APPLICATION(S)

The present application claims priority under 35 U.S.C. § 119 to European Patent Application No. 21197181.7, filed Sep. 16, 2021, the entire contents of which are incorporated herein by reference.

FIELD

One or more example embodiments of the present invention relate to a method for processing an audio signal containing operator speech input, a method based thereon for controlling an apparatus and a corresponding system. Herein, one or more example embodiments of the present invention in particular relate to a method for controlling a medical apparatus and a corresponding medical system including a medical apparatus.

BACKGROUND

Medical apparatuses are typically used to treat and/or examine a patient. For example, imaging modalities are used as medical apparatuses for examining a patient. Such medical imaging modalities can, for example, comprise magnetic resonance apparatuses, computed tomography apparatuses, PET apparatuses (positron-emission tomography apparatuses) etc. Furthermore, interventional and/or therapeutic apparatuses are used to treat a patient, such as a radiation-emitting or radiotherapy apparatus, an apparatus for performing in particular a minimally invasive intervention and the like. Herein, the treatment and/or examination of the patient via the medical apparatus is typically supported by operating staff, for example nursing staff, technical staff, X-ray assistants or physicians.

Before and during the treatment and/or examination of a patient with such a medical apparatus, usually various settings have to be made on the medical apparatus, such as, for example, inputting patient data, setting various device parameters and the like. These steps are typically performed by the operator, wherein the settings of the medical apparatus are typically made via a physical user interface provided on the apparatus into which an operator can make entries.

In order to operate such medical apparatuses economically, a smooth workflow or process flow is desirable. In particular, making settings should be as easy as possible. In this regard, DE 10 2006 045 719 B4 describes a medical system with a speech input apparatus with which specific functions of the system can be activated and deactivated via speech control. Herein, an audio signal captured with the speech input apparatus is processed by a speech analysis module in order to ascertain one or more speech commands from an operator.

SUMMARY

Speech control of complex systems frequently entails a conflict of aims between the speed of speech analysis required for many applications and the most possibly correct and complete capture of the operator's user intention formulated in natural speech. Analysis times that are too long can lead to unnecessary waiting times for the operator and thus to frustration. Conversely, speech analysis that is solely concerned with speed can lead to the execution of an incorrect or incomplete instruction and cause errors, which is often unacceptable, especially in a medical context.

Consequently, it is an object of one or more example embodiments of the present invention to resolve this problem and/or to provide a method for processing an audio signal that allows speech commands from an operator to be ascertained in an improved manner in this respect. In particular, such a method should combine rapid processing times with the capture of the actual user intention that is as error-free as possible. It is furthermore an object of one or more example embodiments of the present invention on this basis to disclose a method for controlling a physical apparatus, wherein the physical apparatus can in particular include a medical apparatus. It is furthermore an object of one or more example embodiments of the present invention to disclose a system—in particular a medical system—comprising the physical apparatus and a corresponding speech analysis apparatus (i.e. to execute the methods).

According to one or more example embodiments of the present invention, the stated object is achieved with a method for processing an audio signal, a method for controlling a physical apparatus, a speech analysis apparatus, a system including the speech analysis apparatus, a computer program product and a computer readable storage medium according to the main claim and the independent claims. Advantageous developments are disclosed in the dependent claims.

The inventive achievement of the object, according to one or more example embodiments of the present invention, is described below both in relation to the claimed apparatuses and in relation to the claimed methods. Features, advantages or alternative embodiments mentioned here are likewise also applicable to the other claimed subject matter and vice versa. In other words, the physical claims (which are, for example, directed at speech analysis apparatuses and associated systems) can also be developed with the features described or claimed in connection with a method. Here, the corresponding functional features of the method are embodied by corresponding physical features.

According to one aspect of one or more example embodiments of the present invention, a computer-implemented method for processing an audio signal is provided. The method comprises a plurality of steps. One step is directed at receiving the audio signal. A further step is directed at recognizing a beginning of operator speech input in the audio signal. A further step is directed at analyzing the audio signal substantially in real time from the recognized beginning of the speech input to provide a speech analysis result. A further step is directed at defining an end of the speech input based on the speech analysis result. A further step is directed at providing a speech data stream based on the audio signal between the recognized beginning and the defined end.

The audio signal can in particular contain sound information. The audio signal can be an analog or digital or digitized signal. The digitized signal can be generated based on the analog signal, for example by an analog-to-digital converter. Accordingly, the step of receiving can comprise a step of providing a digitized audio signal based on the received audio signal or digitizing the received audio signal. The reception of the audio signal can in particular comprise registering the audio signal via a suitable sensor, for example an acoustic sensor such as a microphone.

Herein, the audio signal can comprise a communication from a user (hereinafter also operator), such as, for example, an instruction to be executed or a question. In other words, the audio signal can comprise speech input from the operator in natural speech. Natural speech is typically speech spoken by humans. Natural speech can also include intonation and/or inflection to modulate communication. Unlike formal speech, natural speech can include structural and lexical ambiguities.

The method provides for recognizing the beginning of such speech input in the audio signal. In other words, activity recognition is performed that indicates when the audio signal contains spoken speech. From the time at which speech input has been recognized, the audio signal is relevant for further analysis in order, for example, to deduce the content of the operator speech input. The recognition of a beginning of speech input can in particular comprise the recognition of a human voice in the audio signal. This can take place via signal analysis in that, for example, values such as frequency, amplitude, modulations etc. characteristic of the human voice are recognized in the audio signal.

From the recognized beginning of the speech input, the speech input contained in the audio signal is continuously analyzed. Accordingly, a speech analysis result is provided. The speech analysis result can in particular be understood as a current speech analysis result that changes continuously in the course of the continuous analysis of the operator's spoken speech. A method for processing natural speech can be used for this purpose. In particular, a computational linguistics algorithm can be applied to the audio signal or the speech input for this purpose. One possibility for processing speech input formulated in natural speech to provide the speech analysis result is to convert the speech input formulated in natural speech into text (i.e. structured speech), via a speech-to-text (software) module. Subsequently, a further analysis for providing the speech analysis result, for example via latent semantic analysis (or latent semantic indexing, LSI), can assign meaning to the text. This means that speech analysis and, in particular, an understanding of the natural speech contained in the speech input (also called natural language understanding, NLU) can take place even before the speech input has been terminated.

Analysis substantially in real time means that the audio signal is analyzed continuously. In other words, "rolling" analysis of the audio signal or the speech input contained therein takes place. Thus, there is no need to wait until the operator speech input is complete (or until an end of the speech input has been recognized) in order to subsequently analyze the speech input as a whole, if necessary.

The speech analysis result is used to define an end of the speech input. In other words, the end of the speech input is determined dynamically based on the speech analysis result, i.e. for example based on the semantic content of the previous speech input. Therefore, no fixed "timeout" is used to abort the speech input. Instead, the time interval within the audio signal that is relevant for further analysis of the meaning of the operator speech input is adapted based on a continuous "pre-analysis".

Then, a speech data stream is provided based on the end defined in this way and the recognized beginning. The speech data stream can, for example, comprise the audio signal between the recognized beginning and the defined end or be based thereupon. According to some implementations, the speech data stream can comprise the digitized audio signal between the recognized beginning and defined end or be based thereupon. If the speech analysis result already comprises a transcript of the audio signal or the speech input in text, the speech data stream can also comprise such a transcript or be based thereupon. The speech data stream can, for example, be provided in the form of a recording of the audio signal and/or the speech input between the recognized beginning and the defined end. Accordingly, the step of providing can comprise recording the audio signal and/or the speech input between the recognized beginning and the defined end and providing the recording as the speech data stream. Herein, the speech data stream can in particular be provided for further analysis of the speech data stream, for example in order to recognize one or more speech commands in the speech data stream. Accordingly, the step of providing can comprise providing the speech data stream for a corresponding speech recognition module or a corresponding (second) computational linguistics algorithm or the input of the speech data stream into the speech recognition module or the corresponding (second) computational linguistics algorithm for recognizing one or more speech commands in the speech data stream.

The above features interact synergistically in that the decision to complete the speech input can be defined dynamically based on the previous speech input. Herein, the continuous evaluation of the speech input just spoken and the use of the associated results enable much more reliable end-of-speech recognition and thus significantly better and more reliable usability. It is thus possible to define an end of the speech input as required based on the previous speech input. This makes it possible, for example, to avoid having to wait too long for further speech from the user which means unnecessary waiting times for the user. Conversely, it is also possible to avoid the speech input or recording being prematurely considered to be terminated which can lead to an evaluation of an incomplete instruction and cause errors. In other words, the method steps represent preprocessing for actual speech recognition based on a holistic, i.e. non-continuous, speech analysis of the speech data stream provided. The preprocessing enables the speech analysis also to support more complex commands without slowing down the reaction to time-critical commands. Thus, the method develops an effect outside of pure processing since a speech data stream can be provided that is better adjusted to the circumstances and enables better speech analysis. Furthermore, the course of the method is determined by technical circumstances outside the speech analysis method, namely by the signal properties (frequency components, amplitudes, etc.) of the audio signal and the speech spoken by the operator.

According to one implementation, the method furthermore comprises ascertaining one or more speech commands based on the speech data stream. Optionally, the method furthermore comprises the provision of the speech commands ascertained.

This step is directed at the subsequent processing of the (entire) speech data stream provided. It can in particular be executed with a separate second computational linguistics algorithm, which is applied to the speech data stream. The second computational linguistics algorithm can in particular include a speech-to-text (software) module. For further analysis and identifying one or more speech commands, the second computational linguistics algorithm can additionally or alternatively include a speech recognition (software) module (or NLU module), which can, for example, assign meaning to the speech data stream via LSI.

The two-part processing (part 1 for the required truncation of the speech input and part 2 for the subsequent analysis of the speech input) enables reliable identification of speech commands to be achieved (which regularly requires analysis of the entire speech input). At the same time, the situationally adapted section of the audio signal (in the form of the speech data stream) can support longer and short speech inputs equally well.

The speech commands can, for example, be provided for further processing in particular for generating one or more control signals for an apparatus based on the speech commands. Furthermore, the speech commands can be provided to an operator, for example in that they are displayed via a user interface. The operator can then, for example, verify the speech commands provided.

According to one implementation, the method furthermore comprises a step of adjusting an adaptive time interval based on the speech analysis result. The step of defining the end of the speech input then comprises capturing a time at which the audio signal does not contain any speech input and defining the end of the speech input at the captured time if no new beginning of speech input is recognized starting from the captured time within the adaptive time interval.

According to this implementation, the adaptive time interval can consequently be understood as being a variable timeout after the expiration of which it can be assumed that the operator will not say anything further after the termination of speech input. As described above for the recognition of a beginning of speech input, the recognition of the time at which the audio signal does not contain any speech input can in particular comprise the recognition of a human voice in the audio signal. This can take place via signal analysis, in that, for example, values, such as frequency, amplitude, modulations etc. characteristic of the human voice are recognized in the audio signal. In other words, the recognition of the time at which the audio signal does not contain any speech input can also be based on activity recognition. The recognition of the time can, for example, trigger a timer that measures the time that has elapsed since no further human voice was recognized. The speech input is considered to be terminated if the elapsed time reaches the adaptive time interval and no further speech input was recognized.

The use of an adaptive timeout ensures that the operator is not "cut off" and that the speech input is captured as completely as possible. The dynamic adjustment of the adaptive time interval enables a longer timeout to be selected in situations in which further speech inputs are to be expected. According to some implementations, the adaptive time interval can also be set to zero if, for example, the speech analysis result indicates immediate implementation of a speech command.

According to one implementation, the method furthermore comprises repeating the step of capturing until no new beginning of speech input is recognized starting from the captured time within the adaptive time interval, wherein during the repetition, the step of analyzing is performed continuously and the adaptive time interval is continuously adjusted based on the speech analysis result obtained in this way.

In other words, the speech input is only considered to be terminated when the current timeout has expired without the operator having made a new speech input or without a human voice having been recognized in the audio signal. Herein, the continuous analysis ensures that the adaptive time interval can be adjusted to new circumstances if necessary.

According to one implementation, the method comprises adjusting an adaptive time interval based on the speech analysis result, wherein the step of defining the end of the speech input comprises defining the end of the speech input after the adaptive time interval has elapsed from the recognized beginning of the speech input.

In other words, therefore, no timeout is set in this implementation, but a time interval is defined after which the speech input is considered to be terminated. Here, the adaptive time interval can also be understood to be a "cut-off". This can have the advantage that the relevant speech input can also be considered to be terminated during ongoing speech input. This can, for example, be the case when the previous speech input suggests immediate execution of a command (for example, the command "Stop").

In some implementations, the adaptive time interval is adjusted within a minimum time interval and a maximum time interval.

In this way, it can be ensured that it is not necessary to wait too long for further speech input and also that speech input is not aborted too quickly. If the adaptive time interval refers to a timeout, the minimum time interval can, for example, be set at a value between 250 ms and 750 ms, for example 500 ms. The maximum time interval can, for example, be set at a value between 1000 ms and 2000 ms, for example 1500 ms. If the adaptive time interval refers to a cut-off, the minimum time interval can, for example, be set at a value between 500 ms and 3000 ms, for example 1000 ms. The maximum time interval can, for example, be set at a value between 1000 ms and 10000 ms, for example 5000 ms.

In some implementations, the definition of an end of the speech input can comprise immediately or directly terminating the speech input (or setting the end of the speech input) if, for example, the speech analysis result indicates an immediate execution of a speech command. This can, for example, be the case, if keywords such as "stop", "quick", "halt" or the like are recognized in the previous speech input.

In some implementations, the step of analyzing the audio signal comprises ascertaining a previous duration of the speech input from the recognized beginning. Consequently, the speech analysis result comprises the previous duration of the speech input. In the step of adjusting, the adaptive time interval is then adapted depending on the previous duration, wherein the adaptive time interval is in particular adapted in such a way that the adaptive time interval increases at least in sections with the previous duration.

In other words, the adaptive time interval increases with the previous duration in at least one subrange of the previous durations (for example between a minimum time interval and a maximum time interval). Herein, the increase can, for example, be linear, quadratic, logarithmic or otherwise. The precise course of the increase can be configured individually for the application in question and, if necessary, configured by the user.

Instead of a fixed time interval, this is now selected depending on the previous duration of the speech input (i.e. the time that has elapsed since the recognized beginning of the speech input). The assumption behind this is that it is necessary to take account of pauses for thought, especially with lengthier commands. In this implementation, the operator is therefore given more time to terminate the speech input in the case of commands with a longer duration.

According to some implementations, the step of analyzing the audio signal comprises tokenizing for segmenting letters, words and/or sentences within the audio signal and the speech analysis result comprises associated tokenization information.

In computational linguistics, tokenization refers to the segmentation of text into units at letter, word and sentence levels. According to some implementations, tokenization can comprise converting speech contained in the audio signal into text. In other words, a transcript can be created and then tokenized. For this purpose, it is possible to use a plurality of methods that are known per se, based, for example, on the use of format analysis, hidden Markov models, neural networks, electronic dictionaries and/or language models.

The use of tokenization information enables the structure of the operator speech input to be taken into account when adjusting the adaptive time interval. This enables the adaptive time interval to be adjusted well to the presumed intention of the user. In some implementations, it is, for example, conceivable for the tokenization information to indicate whether the operator has finished speaking a current sentence. In the step of determining, the adaptive time interval can then be shortened if the tokenization information indicates that the operator has finished speaking a current sentence. Additionally or alternatively, the adaptive time interval can be extended if the tokenization information indicates that the operator has not finished speaking a current sentence. In particular, the step of tokenizing can be combined with the adjustment of the adaptive time interval based on the tokenization information with the aforementioned adjustment of the adaptive time interval based on the previous duration of the speech input.

Herein, it is possible, for example, to analyze whether or not a sentence has been completed via grammatical analysis, for example, using a language or grammar model. Additionally or alternatively, signal words can be identified at the end of the current speech input that indicate that a sentence has not yet been completed such as, for example, "and", "specifically . . . " or "I mean". Additionally or alternatively, it is possible to evaluate the operator's inflection, since intonation frequently falls at the end of a sentence.

According to some implementations, the step of analyzing the audio signal comprises a semantic analysis of the audio signal in order to capture a user intention directed at a speech command from the operator. Accordingly, the speech analysis result comprises corresponding semantic information.

In other words, the aim of the semantic analysis is to open up the meaning of the operator speech input. In particular, the semantic analysis can comprise an upstream speech recognition step (speech to text) and/or a tokenization step. In particular, the semantic analysis with the adjustment of the adaptive time interval based on the semantic information can be furthermore combined with the aforementioned adjustment of the adaptive time interval based on the previous duration of the speech input.

Taking account of the meaning of the operator speech input via the semantic information enables the adaptive time interval to be adjusted depending on what has been said so far and in particular in dependence on the presumed intention of the operator (user intention). Thus, the speech recognition (or NLU) is involved in the continuous evaluation of the speech signal just spoken and the use of the results for the decision to end the speech recording. This enables more reliable end-of-speech recognition and thus better and more reliable usability.

According to some implementations, the semantic information indicates whether or not the audio signal contains one or more user intentions, wherein, in the step of determining, the adaptive time interval is shortened if the semantic information indicates that the audio signal contains at least one user intention and/or the adaptive time interval is extended if the semantic information indicates that the audio signal does not as yet contain any user intention.

Herein, the user intention can in particular be an operator speech input directed at one or more speech commands to be determined (or to be considered). Herein, the speech commands can in particular be speech commands relevant for controlling a specific physical device (or apparatus). Accordingly, the provision of such semantic information can comprise receiving one or more possible speech commands and comparing the one or more possible speech commands with the previous speech input. The one or more possible speech commands can, for example, be selected and/or predetermined in dependence on a physical device (or apparatus) to be controlled by speech input.

According to some implementations, the semantic information indicates or contains at least one property of a user intention contained in the audio signal, wherein in the step of determining, the adaptive time interval is adapted based on the at least one property.

In other words, certain characteristics or properties that influence the adaptive time interval and thus the end of the speech input currently being spoken are continuously extracted from the speech input. Herein, ascertaining such a property in the context of the semantic information can in particular comprise receiving one or more possible speech commands and comparing one or more possible speech commands with the previous speech input. The one or more possible speech commands can, for example, be selected and/or predetermined in dependence on a physical device (or apparatus) to be controlled by speech input. The comparison can then be used to infer the property of the associated user intention.

Herein, the at least one property can in particular comprise the complexity of the associated user intention, whether the associated user intention is complete, and/or the urgency of the associated user intention. When setting the adaptive time interval in dependence on these properties, the adaptive time interval can, for example, be shortened if the semantic information indicates that the associated user intention is complete. Conversely, the adaptive time interval can, for example, be extended if the semantic information indicates that the associated user intention is incomplete. Furthermore, the adaptive time interval can be shortened if the semantic information indicates that the associated user intention is urgent or indicates urgent implementation. Conversely, the adaptive time interval can, for example, be extended if the semantic information indicates that the associated user intention does not indicate urgent implementation. Furthermore, the adaptive time interval can be shortened if the semantic information indicates that the associated user intention is not very complex. Conversely, the adaptive time interval can, for example, be extended if the semantic information indicates that the associated user intention is complex (and may require further explanation).

According to a further aspect, a method for controlling a physical, in particular medical, apparatus is provided. The method comprises a plurality of steps. One step is directed at capturing an audio signal containing speech input from an operator of the apparatus directed at controlling the apparatus. A further step is directed at processing the audio signal according to the aforementioned aspect and any possible implementations. A further step is directed at ascertaining one or more speech commands based on the speech data stream. A further step is directed at generating one or more control signals based on the one or more speech commands, wherein the control signals are suitable for controlling the apparatus according to the ascertained speech commands. A further step is directed at inputting the one or more control signals into the apparatus.

The capture of the audio signal can substantially be implemented as described above and, for example, comprise the registration of a sound signal with an acoustic input apparatus such as a microphone. Processing the audio signal provides a speech data stream for further analysis. The associated advantages and possible implementations correspond to those of the aforementioned aspect.

The method furthermore provides for further processing of the speech data stream provided by processing the audio signal in order to identify one or more speech commands in the speech data stream that are relevant for controlling the physical apparatus. In particular, the speech data stream is analyzed to identify one or more speech commands. Herein, it is again possible to apply speech recognition methods (or NLU) in particular. In particular it can be provided that individual words or groups of words are recognized in the speech data stream and compared or associated with a predefined set of possible speech commands for the physical apparatus. The predefined set of possible speech commands can, for example, be present in the form of a command library.

In other words, this implements a two-stage processing scheme, which combines a situational truncation of the speech data to be analyzed with a holistic analysis of the speech data truncated in this way. The latter is advantageous since additional information can be obtained by a holistic analysis. For example, when analyzing word embeddings based on the speech input, it is possible to access the textual context in both temporal directions.

The physical apparatus is initially not further restricted and can initially relate to any technical apparatus configured for speech control. This can, for example, comprise a digital dictation device, a computer, a vehicle's dashboard computer, a robot, a machine and the like. In preferred implementations, the physical apparatus comprises a medical apparatus. The medical apparatus can in particular be embodied to perform and/or support a medical procedure. The medical procedure can comprise an imaging and/or interventional and/or therapeutic procedure, but also monitoring of a patient. In particular, the medical apparatus can comprise an imaging modality, such as, for example, a magnetic resonance device, a single-photon emission computed tomography device (SPECT device), a positron emission tomography device (PET device), a computed tomography device, an ultrasound device, an X-ray device or an X-ray device embodied as a C-arm device. The imaging modality can also be a combined medical imaging device comprising any combination of several of the aforementioned imaging modalities. Furthermore, the medical apparatus can include an interventional and/or therapy apparatus, such as, for example, a biopsy apparatus, a radiation-emitting or radiotherapy apparatus for irradiating a patient, and/or an interventional apparatus in particular for performing a minimally invasive, intervention. According to further implementations, the medical apparatus can additionally or alternatively comprise patient monitoring modules, such as, for example, an ECG device, and/or a patient care device, such as, for example, a ventilator, an infusion device and/or a dialysis device.

According to some implementations, the step of analyzing the audio signal comprises applying a first computational linguistics algorithm to the audio signal and the step of ascertaining one or more speech commands comprises applying a second computational linguistics algorithm to the speech data stream, wherein the first computational linguistics algorithm is different from the second computational linguistics algorithm.

Accordingly, the first computational linguistics algorithm can be embodied to process an audio signal such that that a speech data stream is provided for further processing by the second computational linguistics algorithm. Accordingly, the second computational linguistics algorithm can be embodied to identify one or more speech commands for controlling the physical apparatus based on the speech data stream. According to some implementations, the first computational linguistics algorithm can be implemented as a so-called front-end algorithm, which is, for example, hosted in a local computing unit, such as, for example, the control unit of the physical apparatus or in a local speech recognition module. As a front-end, the processing can take place particularly well in real time so that the result can be obtained with practically no significant time delay. Accordingly, the second computational linguistics algorithm can be implemented as a so-called back-end algorithm, which is, for example, hosted in a remote computing facility, such as, for example, a real server-based computing system or a virtual cloud computing system. In particular, complex analysis algorithms requiring high computing power can be used in a back-end implementation. Accordingly, the method can comprise transmitting the speech data stream to a remote computing facility and receiving one or more analysis results from the remote computing facility based on which the speech commands analysis results are then generated in the step of generating. Alternatively, the speech results can also be received directly from the remote computing facility.

In alternative implementations, the second computational linguistics algorithm can also be implemented as a front-end algorithm. Conversely, the first computational linguistics algorithm can also be implemented as a back-end algorithm.

According to further implementations, the method furthermore comprises receiving a system state from the apparatus, wherein the system state comprises information on a current state of the apparatus, wherein the step of defining is additionally based on the system state.

Herein, the system state can be defined by a respective work step or a series or sequence of work steps currently being executed by the apparatus. Taking account of the current system state enables the end of the speech input to be coordinated with the respective conditions in an even more targeted manner.

According to some embodiments, the system state is configured to indicate whether a state of the apparatus is present that indicates rapid implementation of one or more speech commands, wherein in the step of determining, the adaptive time interval is shortened if the system state indicates that a state of the apparatus is present that indicates rapid implementation of one or more speech commands; and/or the adaptive time interval is extended if no system state of the apparatus is present that indicates rapid implementation of one or more speech commands.

As a result, a system state presumed to require rapid implementation of an operator's command enables rapid commencement of analysis of the speech data stream and the processing response time is improved.

According to a further aspect, a speech analysis apparatus for processing an audio signal is provided. The speech analysis apparatus includes an interface for receiving the audio signal and a control apparatus, wherein the control apparatus is embodied to recognize a beginning of operator speech input in the audio signal, to analyze the audio signal substantially in real time from the recognized beginning of the speech input to provide a speech analysis result, to define an end of the speech input based on the speech analysis result, in particular in a variable manner, and to provide a speech data stream based on the audio signal between the recognized beginning and the defined end.

The control apparatus can be embodied as a central or decentralized computing unit. The computing unit can include one or more processors. The processors can be embodied as a central processing unit (CPU) and/or as a graphics processing unit (GPU). In particular, the control apparatus can be implemented as, or part of, physical apparatus to be controlled by speech input. Alternatively, the control can be implemented as a local, real and/or cloud-based processing server. Furthermore, the control can comprise one or more virtual machines. According to further implementations, the speech analysis apparatus furthermore includes a speech recognition module embodied to ascertain one or more speech commands based on the speech data stream.

The interface can be generally embodied for data exchange between the control apparatus and further components. The interface can be implemented in the form of one or more data interfaces, which can include a hardware and/or software interface, for example a PCI bus, a USB interface, a FireWire interface, a ZigBee or a Bluetooth interface. The interface can furthermore include an interface of a communication network, wherein the communication network can include a local area network (LAN), for example an intranet or a wide area network (WAN). Accordingly, the one or more data interfaces can include a LAN interface or a Wireless LAN interface (WLAN or Wi-Fi). The interface can furthermore be embodied to communicate with the operator via a user interface. Accordingly, the control can be embodied to display speech commands via the user interface and to receive user input in this regard via the user interface. In particular, the interface can comprise an acoustic input apparatus for registering the audio signal.

The advantages of the proposed apparatus substantially correspond to the advantages of the proposed method. Features, advantages or alternative embodiments/aspects can likewise be transferred to the other claimed subject matter and vice versa.

According to a further aspect, a medical system is provided, comprising a speech analysis apparatus according to the preceding aspect and an aforementioned medical apparatus for performing a medical procedure.

In a further aspect, one or more example embodiments of the present invention relate to a computer program product, which comprises a program and can be loaded directly into a memory of a programmable control and program code, instructions and/or means, for example libraries and auxiliary functions, for executing a method for processing an audio signal or a method for controlling an apparatus in particular according to the aforementioned implementations/aspects when the computer program product is executed.

Furthermore, in a further aspect, one or more example embodiments of the present invention relate to a computer readable storage medium on which readable and executable program sections are stored in order to execute all the steps of a method for processing an audio signal or a method for controlling an apparatus according to the aforementioned implementations/aspects when the program sections are executed by the controller.

Herein, the computer program products can comprise software with a source code, which still has to be compiled and linked or only has to be interpreted or an executable software code that only needs to be loaded into the processing unit for execution. The computer program products enable the methods to be executed quickly, identically repeatedly and robustly. The computer program products are configured such that they can execute the method steps according to one or more example embodiments of the present invention via the computing unit. Herein, the computing unit must in each case fulfill the requisite conditions such as, for example, having a corresponding random-access memory, a corresponding processor, a corresponding graphics card or a corresponding logic unit so that the respective method steps can be executed efficiently.

The computer program products are, for example, stored on a computer readable storage medium or held on a network or server from where they can be loaded into the processor of the respective computing unit, which can be directly connected to the computing unit or embodied as part of the computing unit. Furthermore, control information of the computer program products can be stored on a computer readable storage medium. The control information of the computer readable storage medium can be embodied such that it carries out a method according to one or more example embodiments of the present invention when the data carrier is used in a computing unit. Examples of computer readable storage media are DVDs, magnetic tapes or USB sticks on which electronically readable control information, in particular software, is stored. When this control information is read from the data carrier and stored in a computing unit, all the embodiments/aspects according to the present invention of the above-described methods can be performed. Thus, one or more example embodiments of the present invention can also be based on said computer readable medium and/or said computer readable storage medium. The advantages of the proposed computer program products or the associated computer readable media substantially correspond to the advantages of the proposed method.

BRIEF DESCRIPTION OF THE DRAWINGS

Further special features and advantages of the present invention will become apparent from the following explanations of exemplary embodiments with reference to schematic drawings. Modifications mentioned in this context can in each case be combined with one another in order to form new embodiments. The same reference characters are used for the same features in different figures.

In the figures.

DETAILED DESCRIPTION

Figure 1:
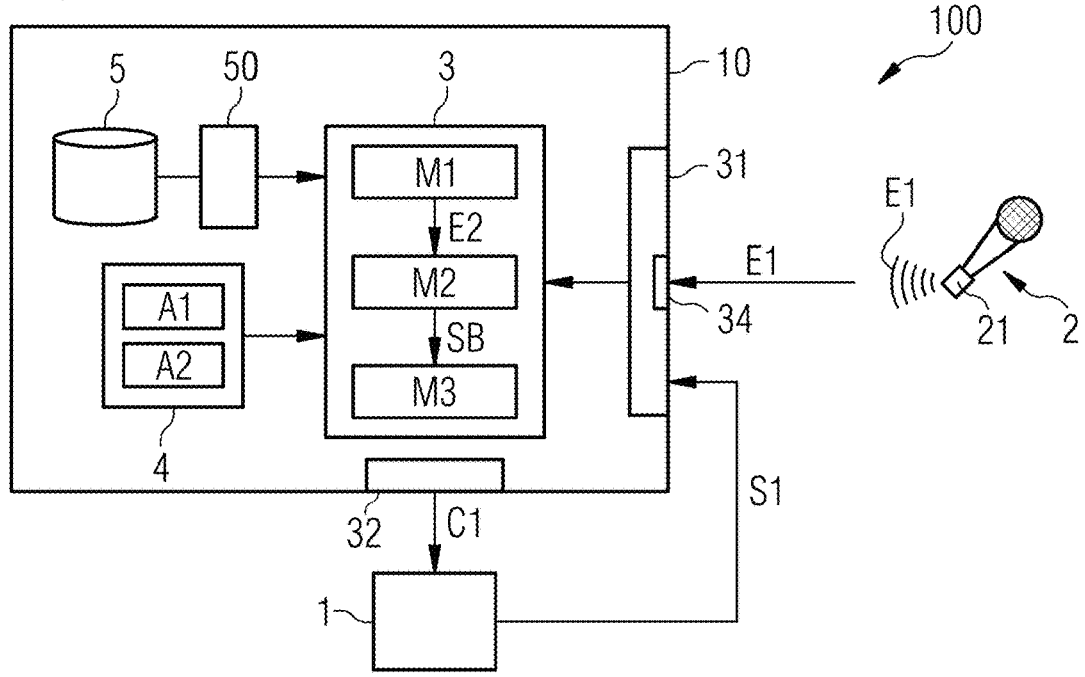
FIG. 1 shows a schematic block diagram of a system for controlling a medical apparatus according to one embodiment.

FIG. 1 is a schematic functional block representation of a system 100 for performing a medical procedure on a patient.

The system 100 includes a medical apparatus 1 for performing a medical procedure on a patient. The medical procedure can comprise an imaging and/or interventional and/or therapeutic procedure.

In particular, the medical apparatus 1 can comprise an imaging modality. The imaging modality can be generally embodied to image an anatomical region of a patient when the patient is brought into an acquisition area of the imaging modality. The imaging modality is, for example, a magnetic resonance device, a single-photon emission computed tomography device (SPECT device), a positron emission tomography device (PET device), a computed tomography device, an ultrasound device, an X-ray device or an X-ray device embodied as a C-arm device. The imaging modality can also be a combined medical imaging device comprising any combination of several of the imaging modalities named.

Furthermore, the medical apparatus can include an interventional and/or therapeutic apparatus. The interventional and/or therapeutic apparatus can generally be embodied to perform an interventional and/or therapeutic medical procedure on the patient. For example, the interventional and/or therapeutic apparatus can be a biopsy apparatus for taking a tissue sample, a radiation-emitting or radiotherapy apparatus for irradiating a patient, and/or an interventional apparatus for performing an intervention, in particular a minimally invasive intervention. According to some embodiments, the interventional and/or therapeutic apparatus can be automated or at least partially automated and in particular robot-controlled. The radiation-emitting or radiotherapy apparatus can, for example, include a medical linear accelerator or another radiation source. For example, the interventional apparatus can include a catheter robot, a minimally invasive surgical robot, an endoscopy robot, etc.

According to further embodiments, the medical apparatus 1 can additionally or alternatively include modules that support the performance of a medical procedure, such as, for example, a patient support apparatus, in particular a patient support apparatus that can be controlled in at least partially automated manner, and/or monitoring devices for monitoring the patient's condition, such as, for example, an ECG device, and/or a patient care device, such as, for example, a ventilator, an infusion device and/or a dialysis device.

According to some embodiments of the present invention, one or more components of the medical apparatus 1 should be controllable by operator speech input. For this purpose, the system 100 includes an acoustic input apparatus 2 and a speech analysis apparatus 10.

The acoustic input apparatus 2 is used to record or capture an audio signal E1, i.e. to record spoken sounds, generated by an operator of the system 100. The input apparatus 2 can, for example, be implemented as a microphone. The input apparatus 2 can, for example, be arranged in a stationary manner on the medical apparatus 1 or elsewhere, such as in a control room. Alternatively, the input apparatus 2 can also be embodied as portable, for example as a microphone of a headset that can be carried by the operator. In this case, the input apparatus 2 advantageously includes a transmitter 21 for wireless data transmission.

The speech analysis apparatus 10 includes an input 31 for receiving signals and an output 32 for providing signals. The input 31 and the output 32 can form an interface facility of the speech analysis apparatus 10. The speech analysis apparatus 10 is generally configured to perform data processing operations and to generate electrical signals. For this purpose, the speech analysis apparatus 10 can include a computing unit 3. The computing unit 3 can, for example, comprise a processor, for example in the form of a CPU or the like. The computing unit 3 can be embodied as a central control unit, for example as a control unit with one or more processors. In particular, the computing unit 3 can be embodied as a control computer of the medical apparatus 1 or as a part thereof. According to further implementations, functionalities and components of the computing unit 3 can be distributed in a decentralized manner across a plurality of computing units or controllers of the system 100.

Furthermore, the speech analysis apparatus 10 includes a data memory 4, and in particular a non-volatile data memory that can be read by the computing unit 3, such as a hard disk, CD-ROM, DVD, Blu-ray disk, floppy disk, flash memory or the like. The data memory 4 can generally store software A1, A2 configured to prompt the computing unit 3 to perform the steps of a method.

As depicted schematically in FIG. 1, the input 31 of the speech analysis apparatus 10 is connected to the input apparatus 2 and the medical apparatus 1. The input 31 can be configured for wireless or wired data communication. For example, the input 31 can include a bus port. Alternatively or additionally to a wired port, the input 31 can also include an interface, for example a receiver 34, for wireless data transmission. For example, as depicted in FIG. 1, the receiver 34 can be in data communication with the transmitter 21 of the input apparatus 2. The receiver 34 provided can, for example, be a Wi-Fi interface, a Bluetooth interface or the like.

The output 32 of the speech analysis apparatus 10 is connected to the medical apparatus 1. The output 32 can be configured for wireless or wired data communication. For example, the output 32 can include a bus port. Alternatively or additionally to a wired port, the output 32 can also include an interface for wireless data transmission, for example a Wi-Fi interface, a Bluetooth interface or the like.

The speech analysis apparatus 10 is configured to generate one or more control signals C1 for controlling the medical apparatus 1 and to provide them at the output 32. The control signal C1 prompts the medical apparatus 1 to perform a specific work step or a sequence of steps. Using the example of an imaging modality embodied as an MR device, such steps can, for example, relate to the performance of a specific scan sequence with a specific excitation of magnetic fields by a generator circuit of the MR device. Furthermore, such steps can relate to the movement of movable system components of the medical apparatus 1, such as, for example, the movement of a patient support apparatus or the movement of emission or detector components of an imaging modality.

To provide the one or more control signals C1, the computing unit 3 can include various modules M1-M3. A first module M1, hereinafter referred to as the speech analysis module M1, is embodied to determine (calculate) a speech data stream E2 containing the relevant speech commands of the operator from the audio signal E1. In particular, the speech analysis module M1 is embodied to define, via continuous analysis of the audio signal E1, a beginning BE and an end EN of a spoken utterance (speech input) relevant for controlling the medical apparatus 1 within the audio signal E1 and, based on the audio signal E1 between the beginning BE and the end EN, to provide the speech data stream E2. For this purpose, the speech analysis module M1 can be embodied to dynamically define an adaptive time interval AZS based on the speech analysis performed by the speech analysis module M1. For this purpose, the speech analysis module M1 can be embodied to apply a speech analysis algorithm A1 (first computational linguistics algorithm) to the audio signal E1. In particular, the speech analysis module M1 can be embodied to execute the method steps S40-A to S40-E (for example by executing the speech analysis algorithm A1) (see FIGS. 4 and 8).

The speech data stream E2 can then be input into a further module M2 of the computing unit 3, hereinafter referred to as the speech recognition module M2. The speech recognition module M2 is embodied to identify one or more speech commands SB based on the speech data stream E2. For this purpose, the speech recognition module M2 can apply a speech recognition algorithm A2 (second computational linguistics algorithm) to the speech data stream E2, wherein the speech recognition algorithm A2 is embodied to recognize one or more speech commands in such speech data streams. In particular, the speech recognition module M2 can be embodied to execute the method step S50 (for example by executing the speech recognition algorithm A2). The speech recognition module M2 preferably does not analyze the signal provided continuously (i.e. virtually in real time), but in a closed manner as a whole. This has the advantage of a more precise analysis result. In particular, this enables word embeddings to be captured more systematically (and not only backward starting from a current word).

The speech commands SB are input into a further module M3, hereinafter also referred to as command output module M3. The command output module M3 is embodied, based on the speech commands SB, to provide one or more control signals C1 suitable for controlling the medical apparatus 1 according to the identified speech commands SB.

Herein, the subdivision into modules M1-M3 is only intended to simplify the explanation of the operation of the computing unit 3 and should not be understood as restrictive. The modules M1-M3 or the functions thereof can also be combined in one element. Herein, the modules M1-M3 can in particular also be understood as computer program products or computer program segments which, when executed in the computing unit 3, implement one or more of the functions or method steps described below.

Figure 2:
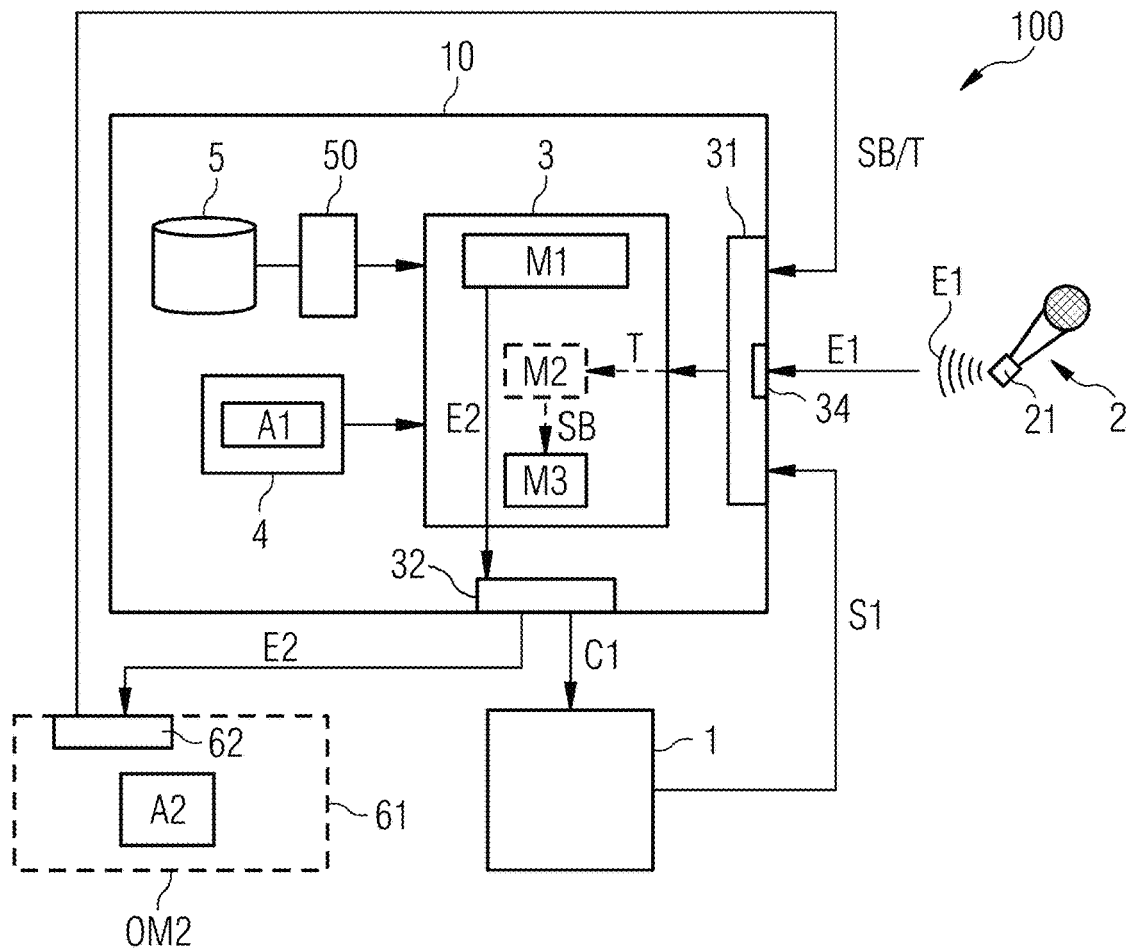
FIG. 2 shows a schematic block diagram of a system for controlling a medical apparatus according to a further embodiment.

FIG. 2 is a schematic functional block representation of a system 100 for performing a medical procedure on a patient according to a further embodiment. The embodiment shown in FIG. 2 differs from the embodiment shown in FIG. 1 in that the functionalities of the speech recognition module M2 are at least partially outsourced to an online speech recognition module OM2. Otherwise, the same reference characters refer to the same components or components with the same function.

The online speech recognition module OM2 can be stored on a server 61 with which the speech analysis apparatus 10 can enter into data exchange via an Internet connection and an interface 62 of the server 61. Accordingly, the speech analysis apparatus 10 can be embodied to transmit the speech data stream E2 to the online speech recognition module OM2. The online speech recognition module OM2 can be embodied to directly identify one or more speech commands SB based on the speech data stream E2 and return them to the speech analysis apparatus 10. Accordingly, the online speech recognition module OM2 can be embodied to make the speech recognition algorithm A2 available in a suitable online memory. Herein, the online speech recognition module OM2 can be understood as a centralized facility that provides speech recognition services for a plurality of clients, in particular local clients (in this context, the speech analysis apparatus 10 can be understood as a local client). The use of a central online speech recognition module OM2 can be advantageous in that more powerful algorithms can be applied and more computing power can be expended.

In alternative implementations, the online speech recognition module OM2 can also "only" return a transcript T of the speech data stream E2. The transcript T can then contain machine-usable text into which the speech data stream has been converted. Based on this transcript T, the module M2 of the computing unit 3 can then, for example, identify the speech commands SB. Such an embodiment can be advantageous if the speech commands SB depend on the circumstances of the medical apparatus 1 which the online speech recognition module OM2 is unable to access and/or the online speech recognition module OM2 has not been prepared to take into account. The capacity of the online speech recognition module OM2 is then used to create the transcript T, but the speech commands are otherwise determined within the speech analysis apparatus 10.

However, conversely, according to a further variation, not shown, further functions of the speech analysis apparatus 10 can be executed in a central server. For example, it is conceivable for the speech analysis algorithm A1 also to be hosted in the online speech recognition module OM2. The online speech recognition module OM2 would then be provided with the audio signal E1 which would then be further processed in the online speech recognition module OM2. The transcript T or the speech commands SB would then be returned.

Figure 3:
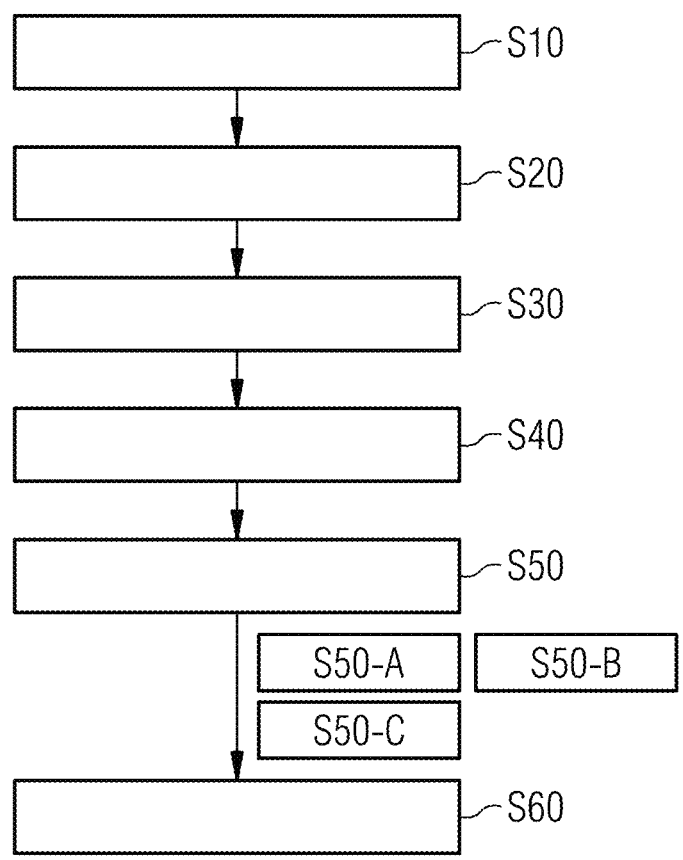
FIG. 3 shows a schematic flow diagram of a method for controlling a medical apparatus according to one embodiment.

In the systems 100 shown by way of example in FIGS. 1 and 2, the medical apparatus 1 can be controlled by a method depicted as a flow diagram in FIG. 3 by way of example. The order of the method steps is not restricted either by the order depicted or by the numbering selected. For example, if necessary, the order of the steps can be interchanged and individual steps can be omitted.

In general, herein, it is envisaged that the operator operating the medical apparatus 1 voices or speaks a command, for example by saying a sentence such as "Start scan sequence X" or "Bring the patient to the starting position", the input apparatus 2 captures and processes an associated audio signal E1 and the speech analysis apparatus 10 analyzes the captured audio signal E1 and generates a corresponding control command C1 for actuating the medical apparatus 1. One advantage of this approach is that the operator can perform other tasks while speaking, for example attend to the preparation of the patient. This advantageously speeds up the workflow. Furthermore, this enables the medical apparatus 1 to be at least partially controlled in a "contactless" manner thus improving hygiene at the medical apparatus 1.

In step S10, initially, the audio signal E1 is captured via the input apparatus 2. The audio signal E1 is provided to the speech analysis apparatus 10 at the input 31 provided or the speech analysis apparatus 10 receives the audio signal E1 via the input 31 (step S20).

In an optional step S30, the current system state S1 of the medical apparatus 1 can be ascertained. The system state S1 of the medical apparatus 1 can, for example, be established by a standby mode of the medical apparatus 1 or by the fact the medical apparatus 1 is currently performing an operation (for example a scan sequence or a method of a system component) or is in a preparatory state for performing a predetermined operation. In general, the system state S1 is defined by a respective work step or a series or sequence of work steps that the medical apparatus 1 is currently executing or is intended to execute. This determines the further work steps that the medical apparatus 1 could potentially perform and thus how it can be actuated and how time-critical an actuation is. For example, the system state S1 can be supplied as an input variable to a look-up table containing the information for various system states for actuating the medical apparatus 1. The medical apparatus 1 provides this system state S1 at the input 31 of the speech analysis apparatus 10, for example as a data signal.

In step S40, the speech analysis apparatus 10 generates a speech data stream E2 from the captured audio signal E1. In other words, therefore, step S40 comprises extracting a speech utterance relevant for controlling the medical apparatus 1 as a speech data stream E2 from the entire audio signal E1. In particular, the generation of the speech data stream E2 comprises various sub-steps in which a beginning BE and an end EN of a spoken utterance (or speech input) relevant for controlling the medical apparatus 1 within the audio signal E1 are detected or defined. Herein, the system state S1 can optionally be taken into account. This can, for example, be implemented by software A1 which is stored on the data memory 4 and prompts the computing unit 3 to perform these steps. Alternatively, corresponding software can be stored in the optional online speech recognition module OM2, which prompts the optional online speech recognition module OM2 to perform these steps accordingly. Various embodiments of the steps for generating the speech data stream E2 from the audio signal E1 are described in more detail below with reference to FIGS. 4 to 6. Optionally, step S40 can additionally entail the use of an analog-to-digital converter (not depicted) which digitizes the analog audio signal E1. As a further option, the speech data stream E2 can be recorded in step S40, for example for further processing.

In step S50, one or more speech commands SB from the operator are ascertained from the speech data stream E2 (or the transcript T). For this purpose, the speech recognition algorithm A2 can be applied to the speech data stream E2. The speech recognition algorithm A2 can, for example, be embodied to recognize whether the speech data stream E2 (or the transcript T) contains one or more speech commands SB relevant for controlling the medical apparatus 1. The speech recognition algorithm A2 can, for example, be contained as software on the data memory 4. In alternative embodiments, the speech recognition algorithm A1 can also be held in the online speech recognition module OM2.

For this purpose, the speech recognition algorithm A2 can, for example, be embodied to ascertain whether one or more speech commands in a command library 50 of the medical apparatus 1 can be assigned to the speech data stream E2 (or the transcript T). This can take place in a rule-based manner based on the signal properties of the speech data stream E2. The command library 50 can contain a selection of speech commands SB to which one or more signal parts of the speech data stream E2 from the operator can be assigned in each case. Herein, a signal part can be a speech utterance from the operator consisting of one or more words. According to some implementations, the command library 50 can furthermore contain a selection of speech commands for the medical apparatus 1 which is loaded in dependence on the current system state S1 of the medical apparatus 1 from a command database 5. The command library 50 is then generated temporarily for a respective system state S1 and can, for example, be loaded as a temporary file into a random-access memory of the computing unit 3. The content of the command library 50, i.e. the individual data sets in which in each case a speech command is linked to one or more signal patterns or speech utterances are loaded from the command database 5. The data sets to be loaded from the command database 5 into the command library 50 depend upon the system state S1 of the medical apparatus 1. For example, during the performance of a specific operation, the medical apparatus 1 may only execute specific other work steps or further work steps. This information can be held in the command database 5 together with a speech command SB which effects the generation of a control command C1 corresponding to the work step.

According to some implementations, the speech recognition algorithm A2 can include a recognition function trained by machine learning as software. The recognition function can be embodied to recognize one or more speech utterances in the speech data stream E2 and to supply a corresponding recognition signal (for example in the form of the transcript T) to the speech analysis apparatus 10, for example via the input 31. The speech utterances ascertained in this way can then be converted into speech commands SB in the speech analysis apparatus 10, for example using the command library explained above.

If the speech recognition function A2 is hosted in the online speech recognition module OM2, step S50 can furthermore comprise one or more of the following sub-steps: an optional sub-step S50-A of transmitting the speech data stream E2 to the online speech recognition module OM2 by the speech analysis apparatus 10, an optional sub-step S50-B of calculating a transcript T of the speech data stream E2 (i.e. of converting the speech data stream E2 into text), an optional sub-step S50-C of receiving the transcript T from the online speech recognition module OM2 by the speech analysis apparatus 10, and an optional sub-step S50-D of identifying one or more speech commands SB based on the received transcript T.

According to further embodiments, step S50 can also be omitted or the functionality of the step S50 can be integrated into step S40. In other words, the result of step S40 can be used directly for further processing. For example, speech commands can also be derived directly in step S40. Accordingly, the speech analysis algorithm A1 can also, for example, be embodied to recognize whether in the speech data stream E2 (or the transcript T) contains one or more speech commands SB relevant for controlling the medical apparatus 1.

In step S60 one or more control signals C1 for the medical apparatus 1 are determined based on the speech commands SB recognized in step S50. For this purpose, the recognized speech commands SB can be supplied, for example in the form of an input variable, to a command output module M3 (or corresponding software stored, for example, on the data memory 4), which then prompts the computing unit 3 to generate one or more control signals C1. The control signals C1 are suitable for controlling the medical apparatus 1 according to the speech command or speech commands SB. Finally, in step S70, control signals C1 are transmitted to the medical apparatus 1 (for controlling the same).

Figure 4:
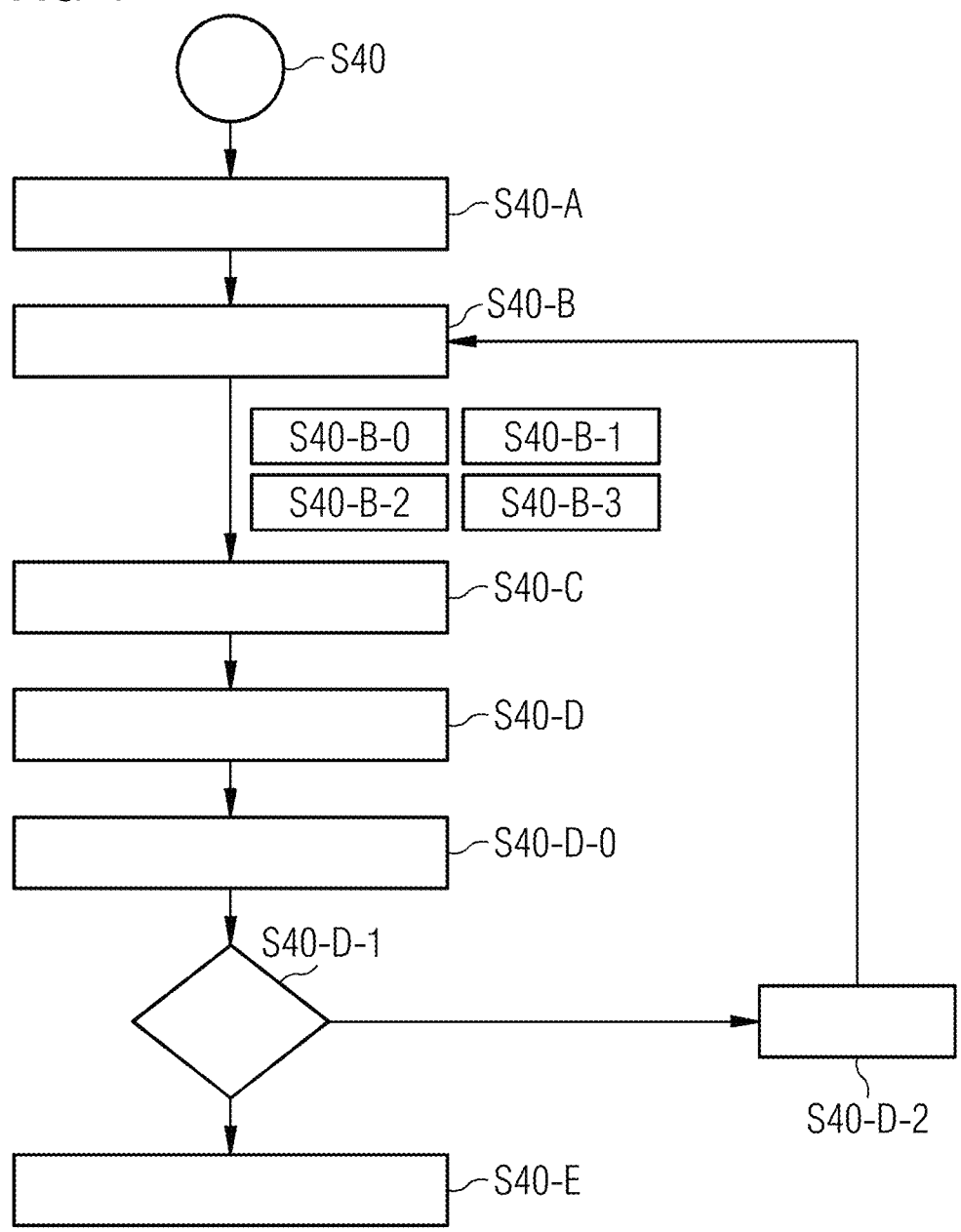
FIG. 4 shows a schematic flow diagram of a method for processing an audio signal according to one embodiment.

FIG. 4 is a flow diagram of an embodiment of a method for processing an audio signal E1 and in particular for determining a speech data stream E2 from the audio signal E1. The order of the method steps is not restricted either by the order depicted or by the numbering selected. For example, if necessary, the order of the steps can be interchanged and individual steps can be omitted. The steps depicted in FIG. 4 can in particular be executed in the context of step S40 from FIG. 3.

Figure 5:
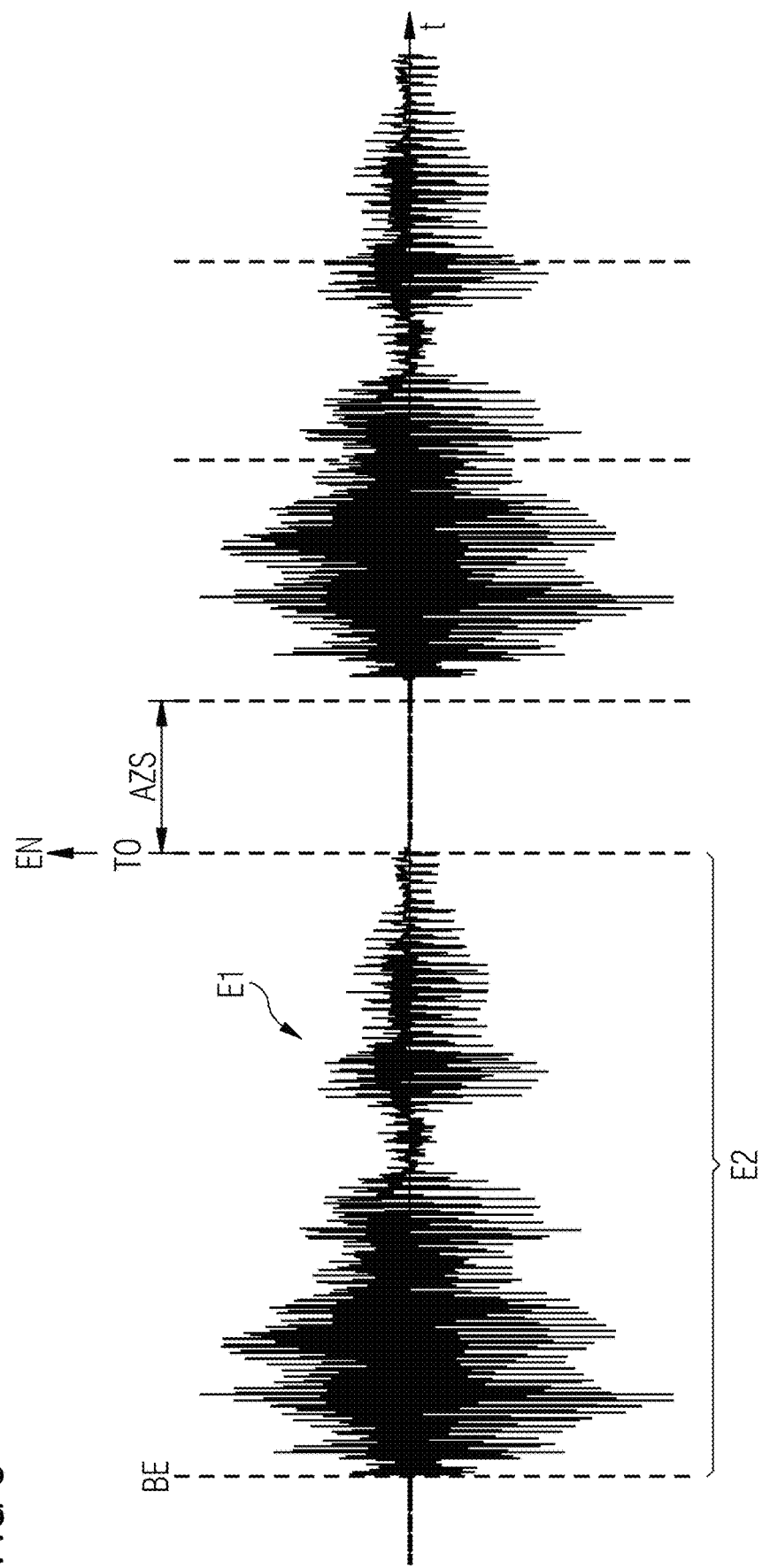
FIG. 5 shows a schematic representation of an exemplary audio signal.
Figure 6:
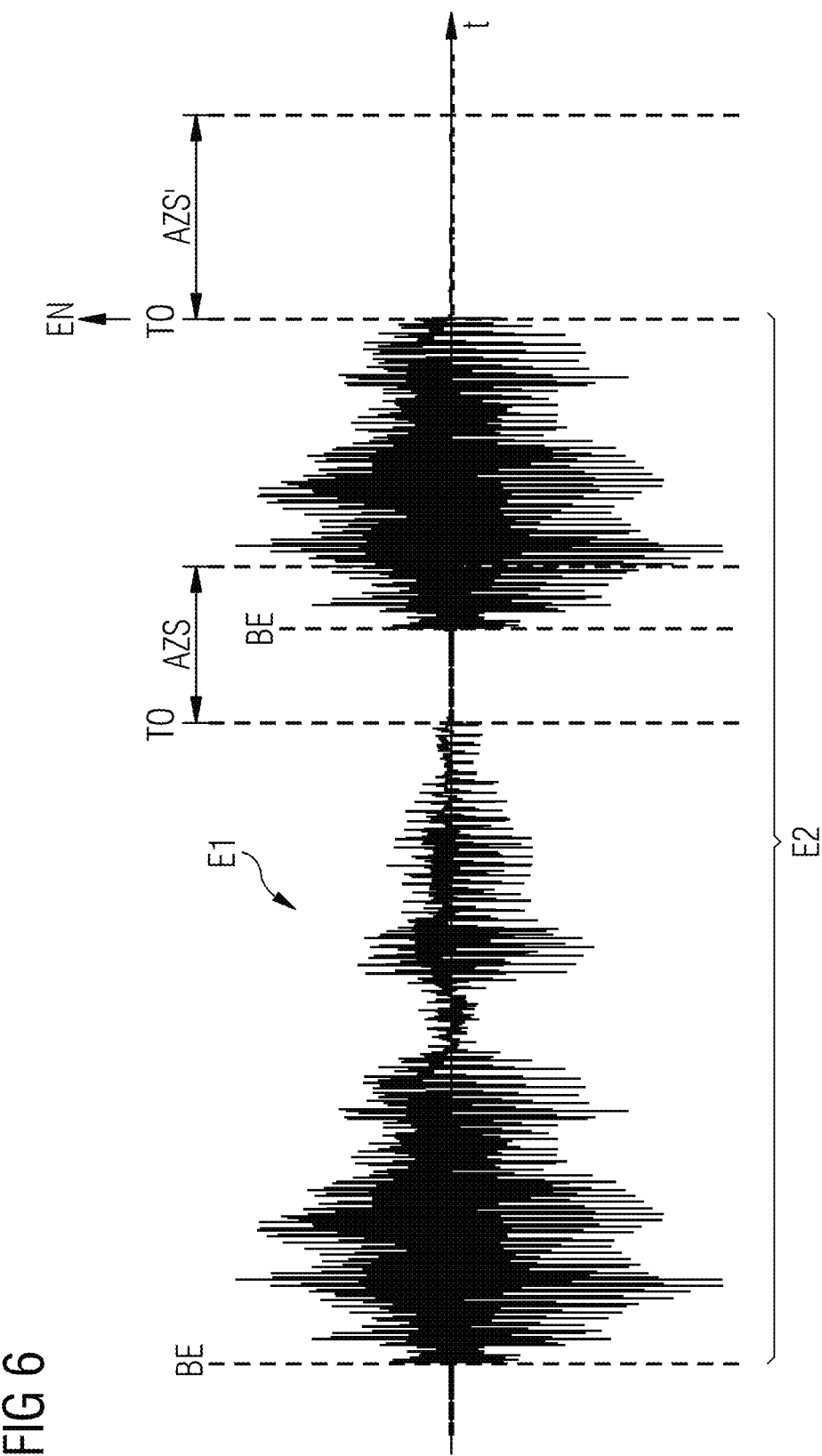
FIG. 6 shows a schematic representation of a further exemplary audio signal.

The method steps shown in FIG. 4 are aimed at dynamically recognizing when speech input from the operator is complete and comprehensive analysis of the speech input can begin (for example in the context of step S50). Depending upon the command to be executed, the speech input can be shorter or longer. In other words, the method steps in FIG. 4 depict a decision-making process as to when the system 100 stops listening to a speaking operator and begins to evaluate the speech input and, if applicable, converts it into control signals C1. For example, a speech data stream E2 of dynamically varying temporal length depending on the speech input is generated from the audio signal E1 and then supplied for further analysis in step S50. Herein, the processing shown in FIG. 4 is based on the setting of an adaptive time interval which is used as a variable "timeout", after the expiration of which a speech input is considered to be terminated if no new operator speech input is recognized during the process. FIGS. 5 and 6 are schematic representations of an audio signal E1 and a speech data stream E2 provided therefrom.

In a first step S40-A, a beginning BE of operator speech input is recognized in the audio signal E1. This can, for example, take place based on the audio signal E1 in that, for example, signal components characteristic of natural speech are recognized. Alternatively, the beginning BE of the speech input can be captured in that the sound information contained in the audio signal E1 is converted into text information (i.e. a transcript T) and the beginning of the speech input is determined based on the transcript T. This functionality can be executed by a corresponding software module stored on the data memory 4 and prompts the computing unit 3 to perform this step. The software module can, for example, be part of the speech analysis algorithm A1 or the speech recognition algorithm A2. Alternatively, a transcript T provided by the online speech recognition module OM2 can be used.

In step S40-B, a continuous and substantially real time analysis of the audio signal E1 is performed by the speech analysis algorithm A1. As a result, the speech analysis algorithm A1 provides a speech analysis result on the basis of which it can be ascertained whether the operator speech input is terminated and further analysis of the operator speech input, in particular by the speech recognition algorithm A2, can begin.

For this purpose, in step S40-C, an adaptive time interval AZS is determined based on the speech analysis result. In this embodiment, the adaptive time interval serves as a timeout. If the activity recognition no longer identifies a human voice in the audio signal E1 after a certain time T0, the elapse of the adaptive time interval AZS is awaited starting from this time T0 (see FIGS. 5 and 6). If no new beginning of speech input is identified during the elapse of the adaptive time interval AZS, the speech input is considered to be terminated and the speech data stream E2 is formed on the basis of the previous speech input (see FIG. 5). If, on the other hand, a new beginning of speech input is recognized within the adaptive time interval AZS, the speech input is not considered to be terminated and the new speech input is added to the speech data stream E2 (see FIG. 6). At the same time, the continuous analysis of the speech input is continued and the adaptive time interval AZS is continuously adjusted. In the example in FIG. 6, this can lead to a changed adaptive time interval AZS', which is longer in this example. In this context, it is explained below how the adaptive time interval AZS can be adjusted.

In a simple case, the speech analysis result can comprise a previous duration D of the operator speech input from the recognized beginning BE of the speech input. For example, it is possible to recognize whether speech input is still ongoing, for example, based on the audio signal E1 itself, as when capturing the beginning BE of the speech input.

Accordingly, step S40-B can comprise an optional step S40-B-0 of capturing the previous duration D of the speech input (for example based on text input extracted from the audio signal). The longer the speech input has already lasted, the longer the adaptive time interval AZS can be set in step S40-C.

Figure 7:
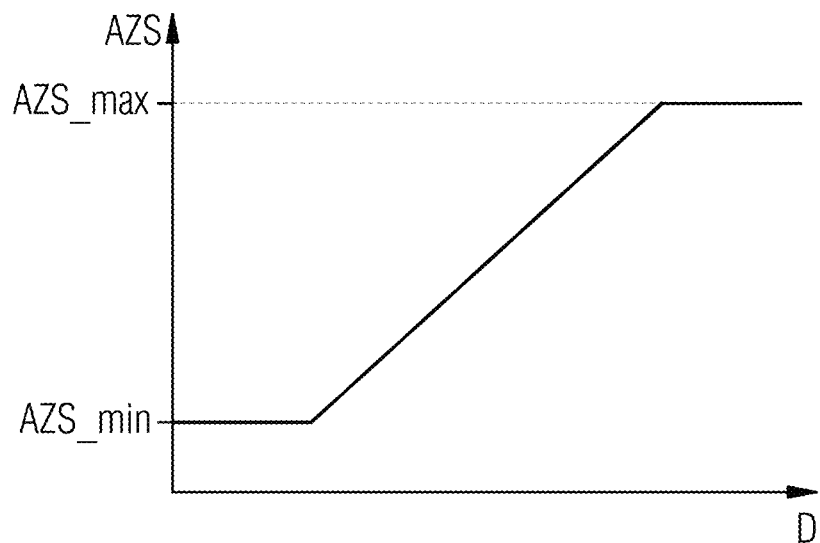
FIG. 7 shows a diagram of an adaptive time interval depending on the previous duration of the operator speech input according to one embodiment.

The background is that speech input that tends to be longer frequently conveys more complex facts that justify a longer wait until further analysis can begin. In addition, with speech input that has already lasted for a long time, it is possible for the operator to take pauses to think. Generally, it can be provided that the adaptive time interval AZS is only varied between a minimum ASZ_min and maximum time interval ASZ_max in order, on the one hand, to guarantee a minimum listening time and, on the other, to ensure the wait for further operator input is not too long. Depending on the previous duration D, transferred to an adjustment of the adaptive time interval AZS, this can, for example, mean that the adaptive time interval AZS increases between a minimum time interval ASZ_min and a maximum time interval ASZ_max with the previous duration D—i.e. at least in a subrange of the previous durations D—(see FIG. 7). Herein, the increase can be substantially linear.

According to further implementations, the speech recognition algorithm A1 can also include a speech understanding module embodied to understand natural speech (this is also known as natural language understanding).

Herein, the speech understanding module can be embodied to initially convert the sound information contained in the audio signal E1 into text information (i.e. to generate a transcript T). The speech understanding module can furthermore in particular be embodied to tokenize the audio signal E1 or the operator speech input or the transcript T. Herein, tokenization refers to segmentation of the speech input, i.e. the spoken text, into units at word or sentence level. Accordingly, the speech analysis result can comprise tokenization information that indicates, for example, whether or not the operator has finished speaking a current sentence.

Accordingly, the step S40-B can comprise an optional step S40-B-1 of converting sound information contained in the audio signal E1 into text information (or generating a transcript T). Furthermore, the step S40-B can comprise an optional step S40-B-2 of tokenizing the speech input or the audio signal E1 or the transcript T to provide the tokenization information.

The tokenization information can be used in step S40-C in order to adjust the adaptive time interval AZS suitably for the situation. If, for example, the operator has not yet finished speaking a sentence, the adaptive time interval AZS can be extended to give the operator sufficient time to terminate the speech input. Conversely, the adaptive time interval AZS can be shortened if the operator has finished speaking a sentence.

According to further implementations, the speech understanding module can additionally or alternatively be embodied to execute a semantic analysis of the audio signal E1 or the operator speech input or the transcript T. Accordingly, the speech analysis result can comprise semantic information about the operator speech input. Herein, the semantic analysis is aimed at assigning a meaning to the speech input. For this purpose, it is, for example, possible to perform a comparison with the aforementioned command database 5 or command library 50 of the medical apparatus 1. In particular, the speech understanding module can ascertain whether one or more speech commands SB contained in a command library 50 of the medical apparatus 1 can be assigned to the transcript T. If this is the case, a user intention directed at the speech command SB can be recognized. Alternatively, for semantic analysis, there can be a comparison with a library that is independent of the medical apparatus 1 and in which, for example, general keywords indicating a specific user intention are listed (such as, for example, "Stop", "Start", etc.).

Accordingly, step S40-B can comprise an optional step S40-B-3 of semantically analyzing the speech input or the transcript T in order to provide semantic information.

In particular, the semantic information can comprise one or more user intentions recognized in the audio signal E1 or the transcript T. If one or more user intentions have been recognized, furthermore the semantic information can in each case comprise one or more properties of this user intention. Such properties can, for example, indicate the complexity of a user intention. This can, for example, be determined by the complexity of an associated control command SB for the medical apparatus 1. Furthermore, a property of a user intention can indicate whether this or the associated speech command SB is complete or how urgent the user intention or the speech command SB is.

In step S40-C, the semantic analysis can be used to adjust the adaptive time interval AZS suitably. For example, if no user intention could be identified, the adaptive time interval AZS can be extended to wait for a user intention. Likewise, the adaptive time interval AZS can be extended if the user intention is incomplete or belongs to a complex speech command SB. Conversely, the adaptive time interval AZS can be shortened if the user intention indicates an urgent speech command SB that needs to be executed quickly.

According to further implementations, in step S40-C, it is furthermore possible to take account of the system state S1 of the medical apparatus 1. The system state S1 can, for example, indicate that the medical apparatus 1 is currently in a state in which a speech command has to be implemented promptly. This can, for example, be the case if a system component is currently being moved. Then, it is, for example, with some probability necessary to implement a stop-command quickly. Consequently, the adaptive time interval AZS should be shortened in order to proceed quickly with the further processing. Conversely, the adaptive time interval AZS can if necessary be extended if the system state S1 indicates that the medical apparatus 1 is at rest or in a stand-by mode.

In step S40-D, the end EN of the speech input is defined with the adaptive time interval AZS determined in step S40-C. For this purpose, step S40-D can include the sub-steps S40-D-0, S40-D-1, S40-D-2. In principle, in this exemplary embodiment, the speech input is considered to be terminated if, after the operator has set a speech activity at time T0, no further speech input is identified in the audio signal E1 within the adaptive time interval AZS. For this purpose, in step S40-D-0, initially a time T0 is identified at which the audio signal E1 does not contain any speech input. Technically, herein, activity recognition can be used, as in step S40-A. In step S40-D-1, a "timer" is triggered that measures the time since no human voice has been recognized in the audio signal E1. If this time reaches the adaptive time interval AZS, the speech input is considered to be terminated and the time T0 can be set as the end EN of the speech input. Otherwise, the processing jumps back to step S40-B via the repetition step S40-D-2.

In step S40-E, the speech data stream E2 is provided on the basis of the recognized end EN. Herein, the speech data stream E2 corresponds to the audio signal E1 between the recognized beginning BE and the end EN of the speech input which is dynamically defined based on the content of the speech input. According to some implementations, the speech data stream E2 can comprise the (possibly digitized) audio signal E1 between the beginning BE and end EN. According to other implementations, the speech data stream E2 can comprise the text information (i.e. the transcript T) between the beginning BE and the end EN.

The speech data stream E2 is then further analyzed in the subsequent step S50 in order to ascertain one or more speech commands. Compared to "rolling" analysis for dynamically defining the adaptive time interval AZS in step S40, this has the advantage that at least a little more time is available for analysis. Consequently, such a two-stage analysis of the audio signal E1 enables adjustment of the "listening time" as required to be combined with a subsequent high-quality evaluation of the speech inputs recorded during the listening period.

Figure 8:
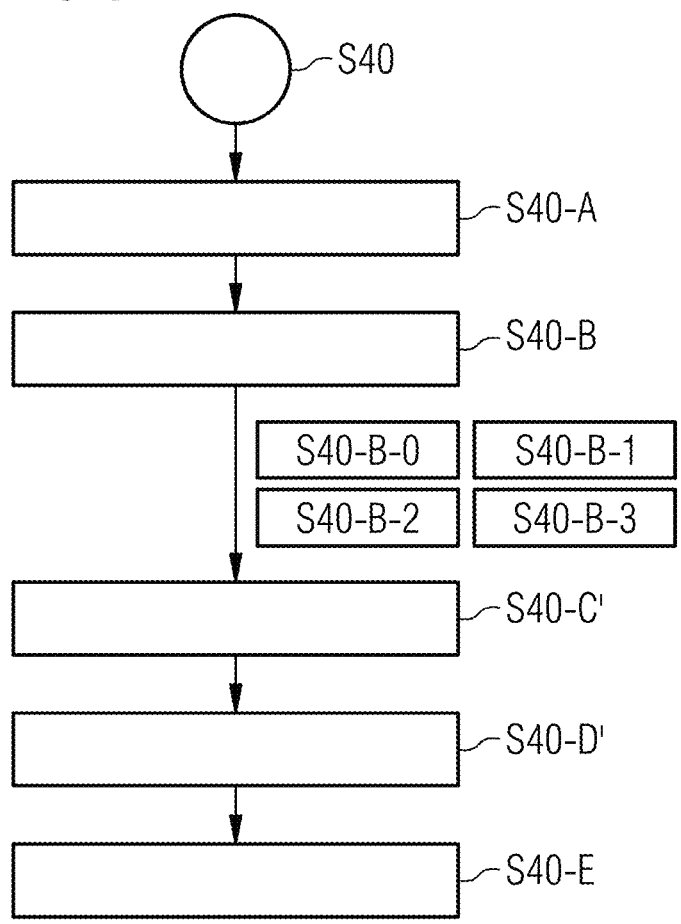
FIG. 8 shows a schematic flow diagram of a method for processing an audio signal according to one embodiment.

FIG. 8 shows a flow diagram of a further embodiment of a method for processing an audio signal E1 and in particular for determining a speech data stream E2 from the audio signal E1. The order of the method steps is not restricted either by the order depicted or by the numbering selected. For example, if necessary, the order of the steps can be interchanged and individual steps can be omitted. The steps depicted in FIG. 8 can in particular be executed in the context of step S40 from FIG. 3. Steps given the same reference characters as in FIG. 4 refer to method steps identical to those in FIG. 4.

Figure 9:
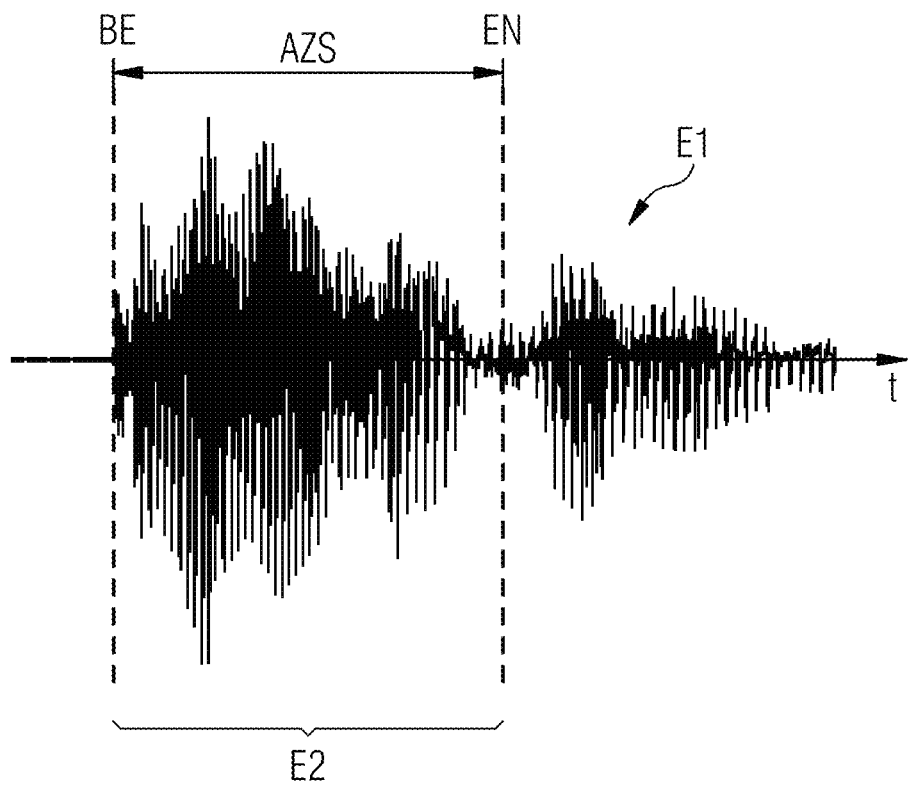
FIG. 9 shows a schematic representation of an exemplary audio signal.

The method steps shown in FIG. 8 are also aimed at dynamically recognizing when an operator speech input is complete and comprehensive analysis of the speech input can begin (for example in the context of step S50). FIG. 9 is a schematic depiction of an audio signal E1 and a speech data stream E2 derived therefrom.

In a first step S40-A, the beginning BE of an operator speech input is recognized in the audio signal E1. Herein, step S40-A corresponds to step S40-A from FIG. 4. In step S40-B, a continuous and substantially real time analysis of the audio signal E1 is performed by the speech analysis algorithm A1. Herein, step S40-B corresponds to step S40-B from FIG. 4.

In step S40-C', an adaptive time interval AZS is determined based on the speech analysis result. In contrast to the previous embodiment, the adaptive time interval AZS determined in step S40-C' is not used as a timeout but as an absolute "cut-off" after the expiration of which the operator speech input is considered to be terminated and is cancelled (see FIG. 9). As a result, if applicable, ongoing speech input can be aborted. Optionally, in step S40, it can be decided whether to terminate the speech input using a timeout (i.e. according to FIG. 4—option 1) or cutoff (i.e. according to FIG. 8—option 2). This can, for example, take place based on the system state S1 or the continuous analysis of the speech input. If, for example, a critical state is detected that requires immediate implementation of a speech command, option 2 can be selected.

The way in which the adaptive time interval AZS can also be defined in the context of FIG. 8 again corresponds to the embodiment described in connection with FIG. 4. In particular, a previous duration D, tokenization information, and/or semantic information can be used to suitably define the adaptive time interval AZS.

The adaptive time interval AZS determined in step S40-C' is used to define the end EN of the speech input in step S40-D'. In step S40-D', the speech input is then considered to be terminated if the adaptive time interval AZS has expired from the recognized beginning BE of the speech input.

In step S40-E, the speech data stream E2 is provided on this basis, wherein step S40-E in FIG. 8 corresponds to step S40-E in FIG. 4.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/ DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although exemplary embodiments have in particular been described in detail with reference to the figures, it should be noted that numerous variations are possible. It should also be noted that the exemplary embodiments are only examples and are not intended to the limit the scope of protection, the application and construction in any way. Rather, the preceding description provides the person skilled in the art with a guide for the implementation of at least one exemplary embodiment, wherein diverse variations, in particular alternative or additional features and/or variations of the function and/or arrangement of the components described can be made as desired by the person skilled in the art without deviating from the subject matter as defined in the appended claims in each case or deviating from its legal equivalent and/or departing from their scope of protection.

What is claimed is:

1. A computer-implemented method for processing an audio signal, the computer-implemented method comprising:
    receiving the audio signal;
    recognizing a beginning of operator speech input in the audio signal;
    analyzing the audio signal from the beginning of the operator speech input to provide a speech analysis result;
    adjusting an adaptive time interval based on the speech analysis result;
    defining an end of the operator speech input based on the speech analysis result, wherein the defining an end of the operator speech input includes
        capturing a time at which the audio signal does not contain any operator speech input, and
        defining the end of the operator speech input at the captured time in response to no new beginning of operator speech input being recognized within the adaptive time interval starting from the captured time; and
    providing a speech data stream based on the audio signal between the beginning of the operator speech input and the end of the operator speech input.

2. The computer-implemented method as claimed in claim 1, further comprising:
    repeating the capturing until no new beginning of operator speech input is recognized within the adaptive time interval starting from the captured time; and wherein during the repeating, the analyzing is performed continuously and the adaptive time interval is continuously adjusted based on the speech analysis result.

3. The computer-implemented method as claimed in claim 1, wherein
    the analyzing the audio signal includes ascertaining a previous duration of the operator speech input from the recognized beginning;
    the speech analysis result includes the previous duration of the operator speech input; and
    the adjusting includes adapting the adaptive time interval based on the previous duration, wherein the adaptive time interval is adapted such that the adaptive time interval increases at least in sections with the previous duration.

4. The computer-implemented method as claimed in claim 1, wherein
    the analyzing the audio signal includes tokenizing for segmenting at least one of letters, words or sentences within the audio signal; and
    the speech analysis result includes associated tokenization information.

5. The computer-implemented method as claimed in claim 4, wherein
    the tokenization information indicates whether the operator has finished speaking a current sentence; and
    the adjusting includes at least one of
        shortening the adaptive time interval in response to the tokenization information indicating that the operator has finished speaking the current sentence, or
        extending the adaptive time interval in response to the tokenization information indicating that the operator has not finished speaking the current sentence.

6. The computer-implemented method as claimed in claim 1, wherein
    the analyzing the audio signal includes performing a semantic analysis of the audio signal to capture a user intention directed at a speech command of the operator; and
    the speech analysis result includes corresponding semantic information.

7. The computer-implemented method as claimed in claim 6, wherein
    the semantic information indicates whether the audio signal contains one or more user intentions; and
    the adjusting includes at least one of
        shortening the adaptive time interval in response to the semantic information indicating that the audio signal contains at least one user intention, or
        extending the adaptive time interval in response to the semantic information indicating that the audio signal does not yet contain any user intention.

8. The computer-implemented method as claimed in claim 1, wherein
    the analyzing the audio signal includes tokenizing for segmenting at least one of letters, words or sentences within the audio signal; and
    the speech analysis result includes associated tokenization information.

9. The computer-implemented method as claimed in claim 1, wherein
    the analyzing the audio signal includes performing a semantic analysis of the audio signal to capture a user intention directed at a speech command of the operator; and
    the speech analysis result includes corresponding semantic information.

10. A method for controlling a physical apparatus, the method comprising:
   capturing an audio signal containing speech input from an operator of the physical apparatus directed at controlling the physical apparatus;
   processing the audio signal according to the method of claim 1;
   ascertaining one or more speech commands based on the speech data stream;
   generating one or more control signals based on the one or more speech commands, the one or more control signals being suitable for controlling the physical apparatus according to the one or more speech commands; and
   inputting the one or more control signals into the physical apparatus.

11. The method as claimed in claim 10, wherein
   the analyzing the audio signal includes applying a first computational linguistics algorithm to the audio signal;
   the ascertaining one or more speech commands includes applying a second computational linguistics algorithm to the speech data stream; and
   the first computational linguistics algorithm is different from the second computational linguistics algorithm.

12. The method as claimed in claim 10, wherein the physical apparatus is a medical apparatus.

13. A non-transitory computer program product including a program that is loadable into a memory, the program including program code that, when executed by at least one processor at a speech analysis apparatus, causes the speech analysis apparatus to perform the method as claimed in claim 1.

14. A non-transitory computer readable storage medium storing readable and executable program sections that, when executed by at least one processor at a speech analysis apparatus, cause the speech analysis apparatus to perform the method as claimed in claim 1.

15. A speech analysis apparatus for processing an audio signal, the speech analysis apparatus comprising:
   an interface configured to receive the audio signal; and
   a control apparatus configured to
      recognize a beginning of operator speech input in the audio signal,
      analyze the audio signal from the beginning of the operator speech input to provide a speech analysis result,
      adjust an adaptive time interval based on the speech analysis result,
      define an end of the operator speech input based on the speech analysis result, wherein defining of the end of the operator speech input includes
         capturing a time at which the audio signal does not contain any operator speech input, and
         defining the end of the operator speech input at the captured time in response to no new beginning of operator speech input being recognized within the adaptive time interval starting from the captured time, and
      provide a speech data stream based on the audio signal between the beginning of the operator speech input and the end of the operator speech input.

16. A medical system comprising:
   a speech analysis apparatus as claimed in claim 15; and
   a medical apparatus configured to perform a medical procedure.

17. The speech analysis apparatus as claimed in claim 15, wherein the control apparatus is configured to define the end of the operator speech input based on the speech analysis result in a variable manner.

18. A speech analysis apparatus for processing an audio signal, the speech analysis apparatus comprising:
   an interface configured to receive the audio signal; and
   at least one processor configured to execute computer-executable instructions to
      recognize a beginning of operator speech input in the audio signal,
      analyze the audio signal from the beginning of the operator speech input to provide a speech analysis result,
      adjust an adaptive time interval based on the speech analysis result,
      define an end of the operator speech input based on the speech analysis result, wherein defining of the end of the operator speech input includes
         capturing a time at which the audio signal does not contain any operator speech input, and
         defining the end of the operator speech input at the captured time in response to no new beginning of operator speech input being recognized within the adaptive time interval starting from the captured time, and
      provide a speech data stream based on the audio signal between the beginning of the operator speech input and the end of the operator speech input.

* * * * *